(12) United States Patent
Reigner et al.

(10) Patent No.: US 8,329,779 B2
(45) Date of Patent: Dec. 11, 2012

(54) ENAMEL

(75) Inventors: Michele Reigner, Morges (CH); Olivier Pujol, Lausanne (CH)

(73) Assignee: Rolex S.A., Geneva (CH)

( * ) Notice: Subject to any disclaimer, the term of this patent is extended or adjusted under 35 U.S.C. 154(b) by 200 days.

(21) Appl. No.: 12/885,823

(22) Filed: Sep. 20, 2010

(65) Prior Publication Data

US 2011/0009525 A1   Jan. 13, 2011

Related U.S. Application Data

(63) Continuation-in-part of application No. PCT/CH2009/000089, filed on Mar. 10, 2009.

(30) Foreign Application Priority Data

Mar. 19, 2008 (EP) ..................................... 08405083

(51) Int. Cl.
*C03C 8/14* (2006.01)

(52) U.S. Cl. .................. 523/170; 106/286.1; 106/286.2; 106/286.3; 106/286.5; 523/205

(58) Field of Classification Search .................. 523/170, 523/205; 106/286.1, 286.2, 286.3, 286.5
See application file for complete search history.

(56) References Cited

U.S. PATENT DOCUMENTS

| 4,701,218 A | 10/1987 | Barker et al. |
| 2006/0240254 A1 | 10/2006 | Kikuchi et al. |
| 2009/0022966 A1 | 1/2009 | Lust et al. |

FOREIGN PATENT DOCUMENTS

| DE | 102006005089 A1 | 8/2007 |
| EP | 0094801 B1 | 11/1983 |
| EP | 0651030 A1 | 5/1995 |
| WO | 2008014623 A1 | 2/2008 |

OTHER PUBLICATIONS

Teraoka, Fumio et al "Characteristics of hard resin teeth with nanocomposite enamel layer," Shika Zairyo—Kikai, 2002, XP-002484615, vol. 20 No. 6, pp. 1-15, cited in ISR.
International Search Report of PCT/CH2009/000089, mailing date Jun. 24, 2009.
International Preliminary Report on Patentability of International application No. PCT/CH2009/000089, dated Jun. 14, 2010. (Form PCT/IPEA/409).

*Primary Examiner* — Edward Cain
(74) *Attorney, Agent, or Firm* — Westerman, Hattori, Daniels & Adrian, LLP

(57) ABSTRACT

The invention relates to a translucent or transparent, colored enamel that contains metal nanoparticles that lost their natural tendency to aggregate with each other, and having a color essentially provided by the reflection of light. The nanoparticles have lost their natural capability to aggregate with each other due to the application of a coating, or because they have been functionalised electrostatically or using highly sterically hindered entities or using hydrophilic entities located at the surface thereof. The nanoparticles may be gold nanoparticles that impart an intense and deep red to said enamel.

26 Claims, No Drawings

ENAMEL

This application is a continuation-in-part of International Application No. PCT/CH2009/000089 filed Mar. 10, 2009, whose contents are hereby incorporated by reference herein in their entirety.

The present invention relates to a colored transparent or translucent enamel. This enamel may be in the form of a layer resting on a substrate that reflects light, the "color" effect then being mainly provided by surface reflection, multiple internal reflections and dispersion.

It is known that enamel is a vitreous compound obtained from a base frit, in the manufacture of which different fluxes are incorporated that make it possible to lower its melting point. It is customarily deposited on a substrate, for example a metal, in order to create patterns thereon, and it is also possible to deposit it "in the void" in metal cells and to thus benefit from the transparency of the enamel in order to obtain certain effects. This is then referred to as "pique-à-jour" enameling. Furthermore, it is known that the color of the enamels is obtained by means of metal particles. Transparent, semi-transparent and opaque enamels exist depending on the composition of the base frit.

Finally, it is known that colloidal gold particles in a glass give, in transmission, an intense deep red coloration. A famous example is Murano glass, the trade secrets of which have been very well guarded to date.

The present invention aims to obtain Murano-type colorations, that is to say intense and deep colorations, not on a glass, but on an enamel. Enamel differs from glass in that, unlike the latter which is obtained by melting its constituents at high temperature, it is applied in the form of an aqueous solution known as "slip", which is dried, before being "fired" at a temperature very substantially below that of the melting point of the glass.

It is also stated that glass is essentially constituted of silica or silicon oxide, whereas enamel generally comprises, besides silica, feldspar, kaolin and metal oxides.

The invention therefore strictly relates to a translucent or transparent enamel containing metal nanoparticles that color it so as to give it a deep and intense color. This is essentially provided by reflection of the light, in particular when the enamel is deposited in layers on a substrate.

According to the invention, the nanoparticles have lost their natural tendency to flocculate, coalesce or aggregate with one another and retain their colloidal stability, both in the slip and in the finished enamel, by remaining isolated and individually separated.

Indeed, an aggregation or a precipitation of the nanoparticles results in dull or brownish colors, or even in a total loss of the red shade, obviously in contrast to the deep and intense red colors that are desired.

A first means for ridding the metal nanoparticles of their ability to aggregate during the preparation of the enamel or during the firing heat treatment of the latter, is to coat them with a substance that is inert with respect to the other constituents present in the slip, for example crystalline silica such as that which is, in particular, described in patent WO 2008/014623, which relates to ceramics and not to enamels.

A second means of eliminating the ability of the metal nanoparticles to aggregate or to assemble with one another is to functionalize their surface.

Various techniques can be used to do this, for example electrostatic repulsion, with the aid of charge carriers placed at the surface of the nanoparticles in such a way that they repel one another and remain in homogeneous suspension. Colloid theory proposes various solutions, including ionization of the functional groups already present at the surface or specific adsorption of ions. Thus, it is possible, for example, to add gum arabic, during the synthesis of the nanoparticles or to the aqueous solution, which will stabilize the suspension.

Another technique, of physical nature, consists in developing at the surface of the nanoparticles, for example by grafting or here too by electrostatic bonds, entities, for example molecules or ions for which the steric hindrance is such that they will no longer be able to become embedded in one another, thus preventing an aggregation or precipitation phenomenon. A good example of such entities is polystyrene which will be adsorbed at the surface of the nanoparticles and sees to it that they cannot approach one another.

Yet another technique is to render the surface of the nanoparticles hydrophilic, for example also by adsorption of entities, especially of molecules, so that the nanoparticles thus rendered hydrophilic will prefer to bond to the water of the solution and to thus move away from one another without being able to come together during the drying of the slip or the firing of the enamel. As hydrophilic substances, use will advantageously be made of substances of the polystyrene type modified by carboxyl groups, or else of surfactants such as sodium dodecylsulfate.

According to the invention, the metal nanoparticles may be constituted of a noble metal such as gold, silver or platinum, or of another metal, for example iron, chromium, copper, cobalt, manganese or else alloys thereof. The metal nanoparticles may also be constituted of a metal oxide, such as for example tin oxide.

One crucial advantage of the enamel according to the invention, considering the ever more restrictive standards as regards the environment and public health, is that, in order to provide the coloration, it is no longer necessary to add the conventional pigments of enamels. It is thus possible to obtain an entire range of colorations and shades over the entire wavelength of the visible spectrum, without using toxic salts such as the salts of lead, of tin, of selenium, of cerium or of cadmium.

Gold customarily gives a red coloration, whereas chromium, for example, will provide a green coloration, all things otherwise being equal. As regards color, the authors are moreover not in agreement with one another on the influence of the size of the nanoparticles, the concentration thereof and the shape thereof.

The invention also relates to layered enamels which may be deposited on a base, a metal surface or another surface that reflects light, for example on white enamel. The intense and deep "color" effect is then amplified by the scattering of the light reflected on the base. It should be noted here that, in order to obtain moiré effects, or "butterfly wing" or "hologram" effects (that is to say effects of iridescence, of variation of colors or of appearance of ghost images when the incidence of the light varies) it is possible to create a final pattern constituted of several layers of enamel, especially if the layers of enamel are of very small thickness, typically of less than 1 µm.

EXAMPLE 1

In this example, an enamel is prepared from the transparent commercial frit No. 619 from Cristallerie de St Paul and from gold nanoparticles produced in accordance with example 1 from patent application WO 2008/014623A1.

The aforementioned commercial frit contains, in particular, silica and lead oxide (minium).

This frit is first milled for 12 hours in a jar with glass beads and demineralized water; the mixture is then filtered, rinsed carefully, then the solid fraction is sieved in order to retain the frit particles greater than 15 micrometers. This frit is then put into solution with demineralized water in order to form a thick slip.

The gold nanoparticles are coated with silica in accordance with Example 1 of patent application WO 2008/014623A1, then put into solution in demineralized water.

The solution of nanoparticles and the enamel slip are mixed carefully; the mixing is carried out with a spatula. The amount of water is adjusted to obtain a fluidity suitable for depositing the enamel. The deposition is carried out with a spatula.

10 grams of milled commercial frit are mixed with 3 grams of aqueous solution containing 4 wt % of the aforementioned gold nanoparticles as pigments. After a manual mixing phase of around 5 minutes, the deposition is carried out with a spatula by spreading the paste as flat tint over a previously polished and cleaned sample of 18 carat yellow gold. The sample is placed on a vibrating plate in order to spread the paste and ensure a homogeneous thickness. It is dried in an oven at 100° C. for 15 minutes, then fired at 650° C. for 6 minutes.

After cooling, a sample of enamel deposited on gold is obtained with a deep dark red hue.

EXAMPLE 2

The enamel is prepared on the same basis as for example 1. The enamel paste produced as above is diluted with demineralized water until a fluidity is obtained that makes it possible to spread the enamel very finely, using a brush, over the sample.

After drying in an oven and firing as in example 1, a sample with a slightly orange hue is obtained on a yellow gold substrate.

CLOSURE

It will have been understood that the disclosure applies to numerous fields concerning decoration, especially on terracotta or metal objects, in particular in the field of jewelry and bijouterie.

The invention also finds an advantageous application in the field of clockmaking or watchmaking for the decoration, with the aid of enamel, of watch cases or dials.

The invention claimed is:

1. A colored translucent or transparent enamel containing metal nanoparticles, wherein the nanoparticles are nanoparticles that have lost their natural tendency to aggregate with one another by coating or by functionalization or grafting of their surface, wherein the enamel comprises silica, metal oxides, and, in addition, at least one of feldspar and kaolin.

2. The enamel as claimed in claim 1, which is in the form of a layer resting on a reflective substrate, the coloration being provided essentially by reflection of the light.

3. The enamel as claimed in claim 1, wherein the nanoparticles have lost their ability to aggregate with one another by functionalization with the aid of charge carriers placed on their surface to obtain an electrostatic repulsion.

4. The enamel as claimed in claim 1, wherein the nanoparticles have lost their ability to aggregate with one another by functionalization or grafting with the aid of entities having high steric hindrance.

5. The enamel as claimed in claim 1, wherein the nanoparticles have lost their ability to aggregate with one another by functionalization with the aid of hydrophilic entities placed at their surface and chosen from polystyrene modified by carboxyl groups and surfactants.

6. The enamel as claimed in claim 1, wherein the metal nanoparticles are nanoparticles of noble metal, or of another metal chosen from the group consisting of iron, chromium, copper, cobalt, manganese, and alloys thereof, or of a metal oxide.

7. A process for manufacturing an enamel as claimed in claim 1, wherein a slip is prepared, added to which are nanoparticles that have lost their ability to aggregate with one another in the slip or during the subsequent firing, then the slip is dried and the raw enamel thus obtained is fired.

8. A process of using an enamel containing metal nanoparticles that have lost their natural tendency to aggregate with one another by coating or by functionalization or grafting of their surface, comprising providing the enamel on an item of bijouterie or jewelry.

9. A process of using an enamel containing metal nanoparticles that have lost their natural tendency to aggregate with one another by coating or by functionalization or grafting of their surface, comprising providing the enamel in a clockmaking or watchmaking process.

10. The process as claimed in claim 9, in which the enamel is in the form of a layer resting on a reflective substrate, the coloration being provided essentially by reflection of the light.

11. The process as claimed in claim 9, in which the nanoparticles have lost their ability to aggregate with one another by functionalization with the aid of charge carriers placed on their surface, to obtain an electrostatic repulsion.

12. The process as claimed in claim 9, in which the functionalization or grafting is carried out with the aid of entities having high steric hindrance.

13. The process as claimed in claim 9, in which the functionalization is carried out with the aid of hydrophilic entities placed at their surface and chosen from polystyrene modified by carboxyl groups and surfactants.

14. The process as claimed in claim 9, in which the metal nanoparticles are nanoparticles of noble metal, or of another metal chosen from the group consisting of iron, chromium, copper, cobalt or manganese, or alloys thereof, or of a metal oxide.

15. The enamel as claimed in claim 3, wherein the charge carriers are gum arabic.

16. The enamel as claimed in claim 4, wherein the entities having high steric hindrance are polystyrene.

17. The enamel as claimed in claim 5, wherein the hydrophilic entities are sodium dodecylsulfate.

18. The enamel as claimed in claim 6, wherein the nanoparticles are nanoparticles of gold, silver or platinum.

19. The enamel as claimed in claim 6, wherein the nanoparticles are nanoparticles of tin oxide.

20. The enamel as claimed in claim 1, comprising silica, lead oxide and gold nanoparticles coated with silica.

21. The process as claimed in claim 7, wherein said slip comprises silica and lead oxide and wherein the nanoparticles are gold nanoparticles that have lost their ability to aggregate with one another by coating with silica.

22. The process as claimed in claim 11, wherein the charge carriers are gum arabic.

23. The process as claimed in claim 8, wherein the enamel is a colored translucent or transparent enamel comprising silica and metal oxides.

24. The process of claim 23, wherein the enamel comprises, in addition, at least one of feldspar and kaolin.

25. The process as claimed in claim 9, wherein the enamel is a colored translucent or transparent enamel comprising silica and metal oxides.

26. The process of claim 25, wherein the enamel comprises, in addition, at least one of feldspar and kaolin.

* * * * *